US012504434B2

(12) United States Patent
Oonishi et al.

(10) Patent No.: US 12,504,434 B2
(45) Date of Patent: Dec. 23, 2025

(54) METHOD FOR MEASURING BLOOD COAGULATION TIME

(71) Applicant: SEKISUI MEDICAL CO., LTD., Tokyo (JP)

(72) Inventors: Kengo Oonishi, Tokyo (JP); Yoshimasa Banba, Tokyo (JP); Tomohisa Nishio, Tokyo (JP)

(73) Assignee: SEKISUI MEDICAL CO., LTD., Tokyo (JP)

( * ) Notice: Subject to any disclaimer, the term of this patent is extended or adjusted under 35 U.S.C. 154(b) by 792 days.

(21) Appl. No.: 17/279,441

(22) PCT Filed: Sep. 25, 2019

(86) PCT No.: PCT/JP2019/037624
§ 371 (c)(1),
(2) Date: Mar. 24, 2021

(87) PCT Pub. No.: WO2020/067171
PCT Pub. Date: Apr. 2, 2020

(65) Prior Publication Data
US 2021/0405072 A1 Dec. 30, 2021

(30) Foreign Application Priority Data

Sep. 25, 2018 (JP) ................. 2018-179271

(51) Int. Cl.
*G01N 33/86* (2006.01)
(52) U.S. Cl.
CPC ..... *G01N 33/86* (2013.01); *G01N 2333/4701* (2013.01)
(58) Field of Classification Search
CPC ... G01N 33/86; G01N 2333/4701; C12Q 1/56
See application file for complete search history.

(56) References Cited

U.S. PATENT DOCUMENTS

| 3,983,004 A * | 9/1976 | Trobisch ................. C12Q 1/56 424/583 |
| 5,055,412 A * | 10/1991 | Proksch ................. G01N 33/86 435/13 |
| 5,358,853 A | 10/1994 | Butler et al. |
| 5,508,170 A | 4/1996 | Butler et al. |
| 5,550,028 A | 8/1996 | Lee et al. |
| 7,867,771 B2 | 1/2011 | Okuda et al. |
| 2003/0157582 A1 | 8/2003 | Roisin et al. |
| 2008/0260858 A1 | 10/2008 | Morrissey et al. |
| 2017/0030933 A1 * | 2/2017 | Kumano ................. G01N 21/82 |

FOREIGN PATENT DOCUMENTS

| CN | 108226540 A | 6/2018 |
| EP | 0 585 987 A1 | 3/1994 |
| JP | 50-85393 A | 7/1975 |
| JP | 6-201702 A | 7/1994 |
| JP | 8-510057 A | 10/1996 |
| JP | 2001-255332 A | 9/2001 |
| JP | 2002-156379 A | 5/2002 |
| JP | 2004-519507 A | 7/2004 |
| JP | 2008-530208 A | 8/2008 |
| JP | 2008-241621 A | 10/2008 |
| JP | 2015-148626 A | 8/2015 |
| JP | 2017-32343 A | 2/2017 |

OTHER PUBLICATIONS van den Besselaar, A M H P, Magnesium and manganese ions accelerate tissue factor-induced coagulation independently of factor IX, Blood Coagulation & Fibrinolysis 13(1):p 19-23, 2002 (Abstract Only) (Year: 2022).*
Extended European Search Report for European Patent Application No. 19865868.4, dated Aug. 5, 2022.
International Search Report for PCT/JP2019/037624 mailed on Nov. 26, 2019.
Written Opinion of the International Searching Authority for PCT/JP2019/037624 (PCT/ISA/237) mailed on Nov. 26, 2019.
Japanese Office Action for corresponding Japanese Application No. 2020-549295, dated Dec. 5, 2023, with English translation.
Chinese Notice of Allowance and Search Report for Chinese Application No. 201980062384.0, dated Jul. 12, 2024, with English translation.
Van Den Besselaar, "Magnesium and manganese ions accelerate tissue factor-induced coagulation independently of factor IX," Blood Coagulation and Fibrinolysis, vol. 13, No. 1, 2002, pp. 19-23.

* cited by examiner

*Primary Examiner* — Robert B Mondesi
*Assistant Examiner* — Naghmeh Nina Moazzami
(74) *Attorney, Agent, or Firm* — Birch, Stewart, Kolasch & Birch, LLP

(57) ABSTRACT

A method for controlling MNPT is required.
Coexistence of a specific metal ion with tissue thromboplastin enables MNPT to be controlled/adjusted to a desired time. Coexistence of the specific metal ion with tissue thromboplastin also enables improvement of stability when a thromboplastin reagent is stored in a solution form.

5 Claims, No Drawings

METHOD FOR MEASURING BLOOD COAGULATION TIME

TECHNICAL FIELD

The present invention relates to methods for controlling the average normal prothrombin time and improving the storage stability of a blood coagulation time measuring reagent containing tissue thromboplastin in a blood coagulation test.

BACKGROUND ART

Monitoring by the prothrombin time (hereinafter, sometimes referred to as PT) is important for management of anticoagulant therapy. PT is measured by use of a thromboplastin reagent containing tissue thromboplastin and a calcium ion. Various kinds of such reagents are commercially available, but reagent performance varies by manufacturers, and the reagents have poor stability when stored in a solution form.

Patent Literature 1 discloses a method including adding a nickel compound to a thromboplastin reagent to adjust the international sensitivity index (ISI) to 1.5 or less, and a composition obtained using of the method. Patent Literature 2 discloses a blood coagulation measuring reagent containing a nonionic surfactant, a nickel ion and a tissue factor, and indicates that the nonionic surfactant and the nickel ion are essential for stabilizing the tissue factor.

However, none of the documents describe control of the average normal prothrombin time (hereinafter, sometimes referred to as MNPT).

Therefore, a method for controlling MNPT has been required.

CITATION LIST

Patent Literature

Patent Literature 1: JP 2001-255332 A
Patent Literature 1: JP 2008-241621 A

SUMMARY OF INVENTION

Technical Problem

The present invention provides methods for controlling the average normal prothrombin time and improving the storage stability of a blood coagulation time measuring reagent containing tissue thromboplastin in a blood coagulation test.

Solution to Problem

The present inventors have been extensively conducting studies for solving the above-described problems, and resultantly found that coexistence of a specific metal ion with tissue thromboplastin enables MNPT to be controlled/adjusted to a desired time, and coexistence of the specific metal ion with tissue thromboplastin also enables improvement of stability when a thromboplastin reagent is stored in a solution form.

That is, in one aspect, the present invention provides the following.

[1] A method for adjusting coagulation time of normal plasma within a preset range, in which one or more ions selected from the group consisting of a cobalt ion, a manganese ion and a lithium ion coexist during coagulation reaction in a method for measuring blood coagulation time by use of a reagent containing tissue thromboplastin and calcium.

[2] A method for improving the storage stability of a blood coagulation time measuring reagent containing tissue thromboplastin and calcium, in which one or more ions selected from the group consisting of a cobalt ion, a manganese ion and a lithium ion coexist in a reagent containing phospholipid and calcium in the blood coagulation time measuring reagent.

[3] A method for adjusting coagulation time of normal plasma within a preset range, in which one or more ions selected from the group consisting of a cobalt ion, a manganese ion and a lithium ion coexist during coagulation reaction in a method for measuring blood coagulation time by use of a reagent containing phospholipid and calcium.

[4] A method for improving the storage stability of a blood coagulation time measuring reagent containing phospholipid and calcium, in which one or more ions selected from the group consisting of a cobalt ion, a manganese ion and a lithium ion coexist in a reagent containing phospholipid and calcium in the blood coagulation time measuring reagent.

Advantageous Effects of Invention

The method of the present invention enables control of average normal prothrombin time and improvement of the storage stability of a blood coagulation time measuring reagent containing tissue thromboplastin in a blood coagulation test.

DESCRIPTION OF EMBODIMENTS

Hereinafter, embodiments of the present invention will be described. The following description is merely illustrative, and the scope of the present invention is not limited by the description, and can be appropriately changed and implemented as long as the spirit of the present invention is not impaired.

Definitions

Unless otherwise indicated, all technical and scientific terms used herein have meanings generally understood by those skilled in the art to which the present invention belongs.

Herein, for example, when a plurality of ranges of numerical values are indicated for a certain matter, a range consisting of a combination of any lower limit and any upper limit in each of the plurality of numerical ranges has the same meaning as the meaning of the range described for the matter.

As used herein, the term "MNPT" means "average normal prothrombin time".

A range of about 11 seconds to about 13 seconds is recommended.

The metal ion that can be used in the present invention can be selected from the group consisting of cobalt, manganese and lithium. Each metal ion can be used in the present invention by preparing a commercially available aqueous solution such as that of cobalt chloride, EDTA2 sodium/cobalt, manganese chloride, manganese sulfate, lithium chloride or lithium acetate.

The concentration of each metal ion that can be used in the present invention can be appropriately selected experimentally in consideration of other conditions, and a preferred example thereof is 0.25 mmol/L to 3.5 mol/L as well as 0.5 mmol/L to 3.0 mol/L.

Without being bound by any particular theory, it is presumed that the effects of metal ions in the present invention are exerted by interaction with tissue thromboplastin and/or phospholipid.

According to the present invention,

[1] it is possible to adjust coagulation time of normal plasma within a preset range, in which one or more ions selected from the group consisting of a cobalt ion, a manganese ion and a lithium ion coexist during coagulation reaction in a method for measuring blood coagulation time by use of a reagent containing tissue thromboplastin and calcium;

[2] it is possible to improve storage stability of a blood coagulation time measuring reagent containing tissue thromboplastin and calcium, in which one or more ions selected from the group consisting of a cobalt ion, a manganese ion and a lithium ion coexist in a reagent containing phospholipid and calcium in the blood coagulation time measuring reagent;

[3] it is possible to adjust coagulation time of normal plasma within a preset range, in which one or more ions selected from the group consisting of a cobalt ion, a manganese ion and a lithium ion coexist during coagulation reaction in a method for measuring blood coagulation time by use of a reagent containing phospholipid and calcium; and

[4] it is possible to improve the storage stability of a blood coagulation time measuring reagent containing phospholipid and calcium, in which one or more ions selected from the group consisting of a cobalt ion, a manganese ion and a lithium ion coexist in a reagent containing phospholipid and calcium in the blood coagulation time measuring reagent.

In addition, according to the present invention, there is provided a blood coagulation time measuring reagent, for example a PT (prothrombin time) measuring reagent, which controls the average normal prothrombin time to be within a desired range and which contains tissue thromboplastin having high storage stability. Further, according to the present invention, there is provided a blood coagulation time measuring reagent, for example an APTT (activated partial thromboplastin time) measuring reagent, which controls the coagulation time of standard plasma to be within a desired range and which contains phospholipid having high storage stability.

The PT measuring reagent according to the present invention includes a reagent containing tissue thromboplastin and calcium, and the APTT measuring reagent according to the present invention includes a reagent containing phospholipid and calcium, and can be provided as a reagent which can be stored in a solution form under refrigeration.

It is needless to say that in carrying out the present invention, known techniques in the field of blood coagulation can be appropriately combined and used, and any modification can be made without departing from the idea of the present invention.

EXAMPLES

Hereinafter, the present invention will be described in more detail by way of Examples, which should not be construed as limiting the present invention.

Example 1. Confirmation of Effect of Coexistence or Cobalt Chloride on MNPT (1-1) Reagent and Sample (1-1-1) Thromboplastin Reagent A solution containing a tissue thromboplastin extract prepared from a rabbit brain by an acetone extraction method and calcium chloride at 1 mmol/L was prepared to obtain a thromboplastin reagent.

(1-1-2) Thromboplastin Reagent Containing Cobalt Chloride

Cobalt chloride was added to the thromboplastin reagent at 0.0, 0.5, 1.0.2.0, 3.0 and 4.0 mmol/L to prepare thromboplastin reagents cobalt chloride at various concentrations.

(1-1-3) Normal Sample

Two different lots of normal citrate pool plasma (Sekisui Chemical Company, Limited) were used.

(1-2) Method for Measuring Prothrombin Time

50 µL of the normal plasma was incubated at 37° C., 100 µL of a thromboplastin reagent at each of the concentrations was then added thereto, and the coagulation time was measured at 37° C. The measurement was performed with an automatic blood coagulation analyzer CP3000 (Sekisui Medical Company, Limited). For each lot of normal plasma, an average was calculated by performing measurement at n=2, and an average for two lots was calculated to obtain a measured value.

(1-3) Results

The coagulation time with the addition of cobalt chloride (0.5 mmol/L to 3.0 mmol/L) was shorter than the coagulation time without the addition of cobalt chloride (0 mmol/L). Table 1 shows the measured values.

TABLE 1

| Concentration of cobalt chloride | MNPT | To non-addition |
|---|---|---|
| 0.0 | 13.16 | 100.0 |
| 0.5 | 13.11 | 99.6 |
| 1.0 | 12.83 | 97.5 |
| 2.0 | 12.87 | 97.8 |
| 3.0 | 13.15 | 99.9 |
|  | Seconds | % |

Example 2. Confirmation of Effects of Coexistence of Various Additive Substances on MNPT of Thromboplastin Reagent and Reagent Storage Stability (2-1) Reagent and Sample (2-2) Method for Measuring Prothrombin Time The reagent and sample (2-1) and the method (2-2) were the same as in Example 1 except that metal salts in Table 2 were used as additive substances.

(2-3) Method for Testing Storage Stability

A thromboplastin reagent containing the above-described additive substances was stored at 37° C. for 28 days, and the prothrombin time of normal plasma was measured to confirm variations in reagent performance.

(2-4) Results

The coagulation time with the addition of the additive substance (1.0 mmol/L) was shorter than the coagulation time without the addition of the additive substance (0 mmol/L) ([B] in Table 2). In addition, the coagulation time after storage at 37° C. for 28 days was equivalent to that without addition, or the extension ratio was lower than that without addition ([E] in Table 2). It was confirmed that the additive substances in the present invention was capable of shortening MNPT in a blood coagulation time measuring reagent containing tissue thromboplastin and enabled improvement of long-term storage stability.

Table 2 shows the measured values.

TABLE 2

| Additive substance (1 mmol/L) | [x] | Day 0 after storage [Ax] | To non-addition [Bx] = [Ax]/[A0]*100 | After storage at 37° C. for 28 days [C] | Extended time (seconds) after storage [Dx] = [Cx] − [Ax] | Extension ratio [Ex] = [Dx]/[D0]*100 |
|---|---|---|---|---|---|---|
| Non-addition | [0] | 12.78 | 100.0 | 13.53 | 0.75 | 100.0 |
| Cobalt chloride | [1a] | 12.45 | 97.4 | 12.95 | 0.50 | 66.7 |
| Manganese sulfate | [2a] | 12.43 | 97.3 | 13.08 | 0.65 | 86.7 |
| Lithium chloride | [3a] | 12.73 | 99.6 | 13.40 | 0.67 | 89.3 |
| Lithium acetate | [3b] | 12.68 | 99.2 | 13.33 | 0.65 | 86.7 |
|  |  | Seconds | % | Seconds | Seconds | % |

For example, when cobalt chloride is added, the procedure for calculating each value is as follows.

$[Bx]=$"$A1a$"/$[A0]*100$ is $97.4$ $[B1a]=12.45$ "$A1a$"/$12.78$ $[A0]*100$, $[Dx]=[Cx]-[Ax]$ is $0.50[D1a]=12.95[C1a]-12.45[A1a]$, and $[Ex]=[Dx]/[D0]*100$ is $66.7[E1a]=0.50[D1a]/0.75$ $[D0]*100$.

The invention claimed is:

1. A method for adjusting coagulation time of normal plasma within a preset range, which comprises:
   (a) providing one or more ions selected from the group consisting of a cobalt ion, a manganese ion and a lithium ion to a coagulation reaction mixture comprising thromboplastin reagent containing tissue thromboplastin and calcium;
   (b) initiating a coagulation reaction by mixing normal plasma to the coagulation reaction mixture from step (a);
   (c) measuring the coagulation time of the normal plasma; and
   (d) confirming the measured coagulation time falls within a preset range of 11 to 13 seconds,
   wherein the concentration of said one or more ions in the coagulation reaction mixture is 0.30 mmol/L to 2.75 mmol/L, and wherein the concentration of said one or more ions results in a coagulation time for normal plasma of 11-13 seconds.

2. The method of claim 1, wherein the concentration of tissue thromboplastin and calcium are kept constant while the concentration of said ions is adjusted.

3. A method for adjusting coagulation time of normal plasma within a preset range, which comprises:
   (a) providing one or more ions selected from the group consisting of a cobalt ion, a manganese ion and a lithium ion to a coagulation reaction mixture comprising reagent containing phospholipid and calcium;
   (b) initiating a coagulation reaction by mixing normal plasma to the coagulation reaction mixture from step (a);
   (c) measuring the coagulation time of the normal plasma; and
   (d) confirming the measured coagulation time falls within a preset range of 11 to 13 seconds,
   wherein the concentration of said one or more ions in the coagulation reaction mixture is 0.30 mmol/L to 2.75 mmol/L, and wherein the concentration of said one or more ions results in a coagulation time for normal plasma of 11-13 seconds.

4. A method for improving storage stability of a blood coagulation time measuring reagent containing tissue thromboplastin and calcium, which comprises providing a storage stability improving amount of a storage stability improving additive consisting of one or more ions selected from the group consisting of a cobalt ion and a lithium ion to a reagent containing tissue thromboplastin and calcium in the blood coagulation time measuring reagent, wherein the concentration of said one or more ions selected from the group consisting of a cobalt ion and a lithium ion in the reagent is 0.50 mmol/L to 1.5 mmol/L.

5. A method for improving storage stability of a blood coagulation time measuring reagent containing phospholipid and calcium, which comprises providing a storage stability improving amount of a storage stability improving additive consisting of one or more ions selected from the group consisting of a cobalt ion and a lithium ion to a reagent containing phospholipid and calcium in the blood coagulation time measuring reagent, wherein the concentration of said one or more ions selected from the group consisting of a cobalt ion and a lithium ion in the reagent is 0.50 mmol/L to 1.5 mmol/L.

* * * * *